United States Patent [19]

Schwarz et al.

[11] 4,262,238

[45] Apr. 14, 1981

[54] CONTROLLED CURRENT SUPPLY CIRCUIT FROM A BATTERY TO A MOTOR

[75] Inventors: Albrecht Schwarz, Gerlingen; Peter Pfeffer, Lauffen, both of Fed. Rep. of Germany

[73] Assignee: Robert Bosch GmbH, Stuttgart, Fed. Rep. of Germany

[21] Appl. No.: 46,794

[22] Filed: Jun. 8, 1979

[30] Foreign Application Priority Data

Jul. 18, 1978 [DE] Fed. Rep. of Germany ....... 2831479

[51] Int. Cl.³ .............................................. H02P 5/06
[52] U.S. Cl. ................................... 318/341; 318/445; 318/480; 318/306; 318/139
[58] Field of Search ................. 307/252 M; 361/6, 18, 361/33, 100; 318/139, 306, 345 C, 345 G, 341, 445, 480

[56] References Cited

U.S. PATENT DOCUMENTS

| | | | |
|---|---|---|---|
| 3,689,818 | 9/1972 | Morton et al. .................... | 318/341 X |
| 3,902,105 | 8/1975 | Delaney et al. .................. | 318/139 X |
| 3,925,709 | 12/1975 | Mitchell et al. .................. | 361/100 |

*Primary Examiner*—Ulysses Weldon
*Attorney, Agent, or Firm*—Frishauf, Holtz, Goodman & Woodward

[57] ABSTRACT

To reliably turn OFF a pulse-controlled thyristor in series with a battery supplied motor circuit, in case of malfunction of the control circuit, or even of the supervisory circuit itself, the voltage across the thyristor is sensed and, if an ON condition of the thyristor, as represented by sensed voltage, is determined while the pulse source does not provide an ON command, a disabling control signal is applied to the pulse source to provide an OFF command; in case of failure of the sensing element, an additional voltage is supplied, through a time delay circuit to the disabling input. Time delay circuits are interposed between the respective sensed signal and command signal and applied through a logic circuit to prevent spurious operation of the monitoring and safety circuit.

11 Claims, 2 Drawing Figures

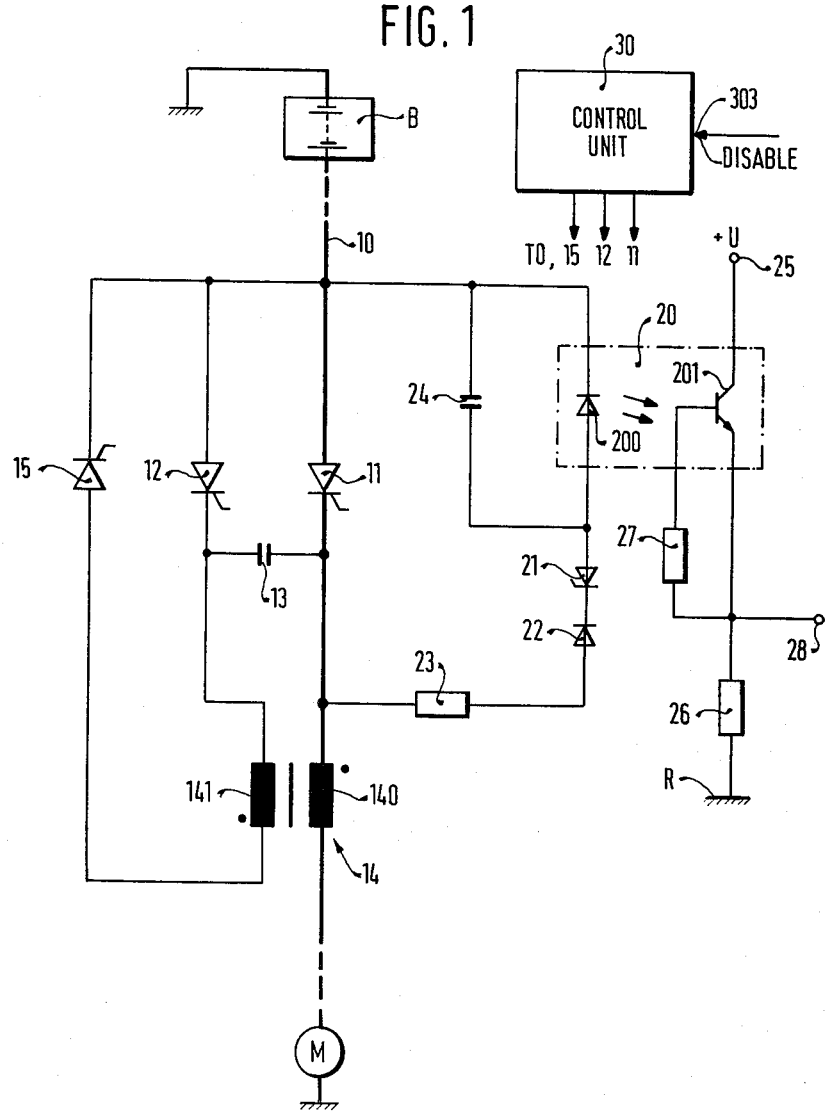

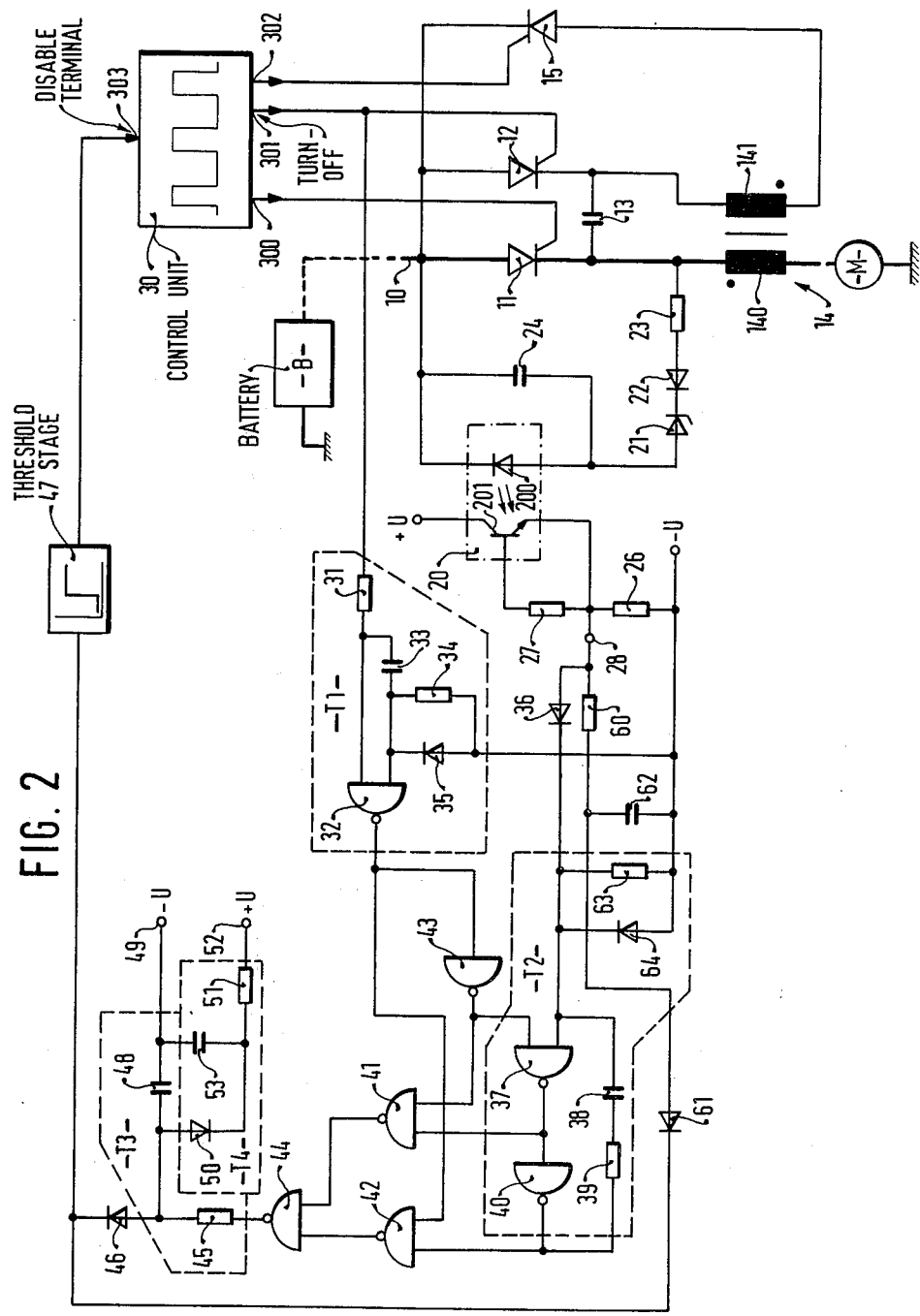

CONTROLLED CURRENT SUPPLY CIRCUIT FROM A BATTERY TO A MOTOR

The present invention relates to a motor circuit to operate an electrical motor from a battery, and more particularly to the type of circuit in which the battery supply current is provided in pulses so that the speed and output of the motor can be controlled by controlling the time-averaged current to the motor.

BACKGROUND AND PRIOR ART

Current supply circuits for electrical motors, for example to supply current from a battery to an electrically driven fork lift loader or the like, to electric vehicles such as run-abouts, and electrically driven automobiles, use circuits in which the energy supplied by the battery is most efficiently applied to the motor. In a frequently used circuit, a thyristor is pulsed in accordance with desired operating conditions of the motor to transfer only that amount of energy from the battery as can be actually used under the desired conditions. The operation of the thyristor must be carefully monitored and various control arrangements, including supervisory monitoring arrangements, have been proposed. If the main current controlling thyristor should become defective, for example burn out and form a short circuit, dangerous operating conditions might result. Likewise, the control unit may become defective and gate the thyristor continuously ON. It is, therefore, necessary to supervise the motor current or motor voltage to prevent draining the supply battery, which typically is a secondary or storage battery. British Pat. No. 1,344,614 describes (to which U.S. Pat. No. 3,689,818, Morton et., corresponds) a control arrangement in which a motor current signal is provided which is compared with a control pulse signal which controls firing of the main thyristor. Circuits are connected to interrupt current supply to the main thyristor if a motor current signal is sensed although the control signal is absent or OFF.

Sensing of the motor current signal, although theoretically simple, causes difficulties in actual practice. If a measuring resistor is included in the main current supply circuit to the motor, non-linearities will result; direct current sensing can be used employing Hall generators which, however, are subject to output variations upon change in temperature. It has also been proposed to supervise the operation of the motor-thyristor control system by supervising motor voltage. Inductive voltages arising in the motor, which change with motor operation, can provide erroneous output signals which either may be in the form of "false alarms" or insufficient indication of malfunction.

THE INVENTION

It is an object to provide a control system which supervises the operation of a current supply circuit from a battery to a motor, which is simple, reliable, and effective in use, by providing output indications if, and only if, there should be malfunction in the motor control circuit.

Briefly, the voltage drop across the main current supply thyristor is sensed when the thyristor is in blocked condition. This voltage drop is compared with a cyclical command signal typically in pulse form which commands turn-off of the thyristor; if a cyclical command signal typically in pulse form to turn the thyristor OFF is present, but the voltage across the main thyristor is not of the value representative of turn-off state thereof, an error signal is provided which, for example, can be connected to the main control circuit to disconnect the control circuit from the thyristor.

In accordance with a preferred feature of the invention, the signal across the main thyristor is picked off by an opto-coupler which, when the thyristor is placed in blocked or interrupting condition, will have a brief current pulse flowing therethrough, transfer of the signal through the opto-coupler being effected without loading the thyristor and without interfering with the voltage of the main circuit, and without galvanic connection therewith.

The system has the advantage that the operating reliability of the overall current supply system is improved and that turn-OFF of the thyristor can be continuously and rapidly supervised. The opto-coupler permits pick-off of the signal representative of the voltage across the thyristor without galvanic connection thereto which has specific advantage that high voltages being switched by the thyristor are effectively galvanically isolated from the monitoring circuit. A Zener diode can be used in the circuit which senses the thyristor voltage which has the additional advantage that only those turn-OFF events of the thyristor are sensed which effect complete extinction or blocking of the thyristor and that partial control of the thyristor to OFF condition will not be sensed, and thus are isolated from or suppressed with respect to the monitoring circuit. Suitable timing circuits can readily be incorporated into the system so that, by suitable timing, erroneous triggering of the monitoring circuit which might be analogous to a false alarm can be suppressed.

DRAWINGS, ILLUSTRATING PREFERRED EXAMPLES

FIG. 1 is a basic circuit diagram of the system of the present invention to sense the thyristor output voltage; and FIG. 2 is an overall circuit diagram of the thyristor voltage sensing circuit and the associated monitoring circuit.

A main line 10 forms a portion of the main connecting line between a battery B and a motor M. A main thyristor 11 is serially connected between the battery and the motor. The series circuit of a turn-OFF or extinction thyristor 12 and a clearing or turn-OFF capacitor 13 is connected in parallel to the thyristor 11. A transformer 14 has its primary 140 connected in series with the main circuit 10; the secondary 141 is connected to the junction between the clearing thyristor 12 and the clearing capacitor 13 and through a charge thyristor 15 back to the main line 10, at the junction where the anode of the main thyristor 11 connects thereto. A further circuit is connected in parallel across the main thyristor 11, formed by an opto-coupler 20 which includes a luminescent diode 200, a Zener diode 21 and a further diode 22, as well as a series resistor 23. A capacitor 24 is connected across the input of the opto-coupler 20. The output of the opto-coupler 20 includes a photo transistor 201, the collector of which is connected to a positive supply voltage connected to terminal 25, and the emitter of which is connected through a resistor 26 to ground, chassis or reference potential. A resistor 27 is connected between the emitter and the base of the transistor 201. The output voltage can be taken off terminal 28 with respect to chassis or reference voltage, that is, across resistor 26.

The circuit is controlled from a control unit 30, having a disable input 303.

Operation: Let it be assumed, initially, that the thyristors 11, 12 and 15 are all in blocked condition. Upon connection of an outside control voltage to the main thyristor 11 and the thyristor 15, current will flow through the main thyristor 11 and the primary 140 of the transformer 14. Consequently, current will be induced in the secondary 141 which flows through the thyristor 15 and back through the main thyristor 11 to build up a charge across capacitor 13. The charge thyristor 15 will block when voltage on the oscillatory circuit formed by the inductance of the transformer 14 and the capacitor 13 changes sign. To turn OFF the main thyristor 11, a control voltage is applied to the turn-OFF thyristor 12 which permits the capacitor 13 to discharge over the main thyristor 11 and the thyristor 12—now conductive—providing a current counter the current flow due to battery B. The charge capacitor 13 is so dimensioned that the total or sum current through the main thyristor has, algebraically, a sign which is reverse to the current flow due to battery B, so that the main thyristor 11 will block. As soon as thyristor 11 is blocked, current will flow through the thyristor 12, the capacitor 13, resistor 23, diode 22, Zener diode 21 and light-emitting diode (LED) 200 of the opto-coupler 20. This causes transistor 201 to become conductive and a voltage can be taken across resistor 26, i.e., on terminal 28 and reference or chassis R which corresponds to the extinction or OFF condition of the main thyristor 11 and can be used as an indicating signal representing "OFF" of the thyristor 11. Diode 22 prevents current flow through LED 200 during the time that the thyristor 11 is conductive. Zener diode 21 has the function to provide for current flow through LED 200 upon blocked main thyristor 11 only is the voltage across the capacitor 13 exceeds a predetermined value. This value can be determined by suitable dimensioning of the respective elements that only complete extinction or turn-OFF of the main thyristor 11 will be recognized and partial changes in conduction of the thyristor which might occur due to insufficient charge of the capacitor 13 will not be recognized or considered by the circuit.

FIG. 2 illustrates the circuit of FIG. 1 in combination with a complete control system, in which elements previously explained have been given the same reference numerals and will not be described again.

The control electrodes of the thyristors 11, 12, 15 are connected to respective outputs 300, 301, 302 of the control unit 30 which is a pulse control stage. The output 301 associated with the turn-off thyristor 12 is also connected through a resistor 31 to one input of an NAND-gate 32. The second input thereto is connected through a capacitor 33. The junction between the capacitor 33 and the NAND-gate 32 is connected to a parallel resistor 34- diode 35 circuit which is connected to the source of reference, −U. The reference terminal −U and the chassis or ground terminal of the battery B can be the same. Terminal 28 forming the output of the opto-coupler is connected over diode 36 to the input of a NAND-gate 37 and further through a capacitor 38 and a resistor 39 to the output of an inverter 40. The input of inverter 40 is connected to the output of the NAND-gate 37 and to one input of a NAND-gate 41. The output of the inverter 40 is further connected to an input of a NAND-gate 42, the second input of which is connected to the output of the NAND-gate 32. The output of NAND-gate 32 is further connected to the input of an inverter 43 which is connected to the second input of NAND-gate 41 and NAND-gate 37. The outputs of NAND-gates 41, 42 are connected to the input of NAND-gate 44, the output of which is connected over a resistor 45 and a diode 46 to the input of a threshold stage 47. Threshold stage 47 is connected to a turn-OFF input of the pulse control stage 30. The junction between resistor 45 and diode 46 is connected over a capacitor 48 to terminal 49 of ground or negative operating voltage; a diode 50 and a resistor 51 connect to positive terminal 52. Capacitor 53, connected in form of a filter capacitor, is connected between terminal 49 and the junction between diode 50 and resistor 51.

Terminal 28 of the opto-coupler is further connected over resistor 60 and diode 61 to the input of threshold stage 47. The junction between resistor 60 and diode 61 is connected through capacitor 62 to negative voltage terminal −U or terminal 49. One input of the NAND-gate 37 is likewise connected through a parallel network consisting of resistor 63 and diode 64 to negative terminal −U.

Operation of circuit of FIG. 2: A turn-OFF command will appear at the output 301 of the pulse control stage 30. Upon occurrence of such a command, a first timing stage T1 is formed by the components 31 to 35 so that the output of the NAND-gate 32 will provide a pulse of a predetermined duration. Similarly, a signal at terminal 28, which is obtained as described in connection with FIG. 1, starts the timing interval of a second timing stage T2 formed by elements 37 to 40 and 63, 64. The gates 41 to 44 are logically so interconnected that the output of the NAND-gate 44 will have a positive logic signal only when the first timing circuit T1 has been SET and the second timing circuit is NOT SET. This is the case if a turn-OFF pulse is available at terminal 301, but the terminal 28 will not have a signal thereon indicative of turn-OFF, that is, either the main thyristor 11 has not turned OFF as it should have, or there is malfunction in any one of the elements of the circuit of FIG. 1.

If the output of NAND-gate 44 has a positive logic signal, capacitor 48 will charge, and after a predetermined time, the threshold switch 47 will respond which, in its turn, will turn OFF the pulse source 30. The threshold value of the threshold stage 47 is so determined that the threshold level thereof will be reached about within 60% of the time of the first timing circuit. The timing for the threshold stage is determined by the elements 45, 48 forming timing circuit T3. Tolerances within the respective components of the first timing circuits T1, T2 thus are not noticeable. The time duration determined by the second timing element T2 is longer than that of the first, T1. This is not material since, if the second timing stage is SET, and the first timing stage is NOT SET, the logic circuit will not respond at all. Tolerances within the components of the second timing circuit, therefore, will not become material.

The RC circuit 51, 53 and diode 50 form circuit T4, and are provided to lock the output of the NAND-gate for a predetermined time when the circuit is placed into operation so that false alarms upon first placing the circuit in operation are excluded. The RC circuits 60, 62 ensure that the threshold circuit 47 will be triggered even if the photo-transistor 201 should alloy through or short circuit, since the capacitor 62 can then charge to a sufficiently high voltage. Trouble such as open circuits or shorts in other elements of the circuit in accordance with FIG. 1, which might interfere with a proper turn-OFF signal, will also be sensed by the threshold circuit 47 since, for example in the case that LED 200 is burned out, no turn-OFF signal will appear at the terminal 28.

The RC circuit 45, 48 ensures that, due to the switching speed of the turn-OFF thyristor 12 and of the main thyristor 11, the turn-OFF signal will be delayed with respect to the turn-OFF command. At the initiation of any turn-OFF command conduction of thyristor 11 is recognized as an error or fault by the logic circuit; it does not trigger the threshold circuit 47, however, since a short output signal on the NAND-gate 44 will not be sufficient to charge the capacitor 48 to a sufficiently high value to trigger the threshold stage 47. Timing circuit T3 thus prevents false alarms.

The turn-OFF command and the consequent turn-off signal are thus formed by pulses of predetermined pulse length, the logic circuit recognizing, due to the logic connection, erroneous operation of the thyristor. By suitable dimensioning of the pulse length, tolerances of the respective elements can be balanced or eliminated. Even if the opto-coupler 20 should fail, for example by either alloying of the photo-transistor 201 or burn-out of the LED 200, the pulse source would still be turned OFF so that the system ensures that the thyristor will, reliably, be turned OFF and that in spite of trouble or malfunction within the supervisory circuit itself, the thyristor turn-OFF circuit will not thereby be affected.

Various changes and modifications may be made, and features described in connection with any one of the embodiments may be used with any of the others, within the scope of the inventive concept.

In an example, in which the main battery B voltage was 24 V, for supply of a motor M of 5 HP output, the following values were suitable:
transformer ratio of transformer 14: 1:8
capacitor 13: 180 μF
capacitor 24: 6.8 nF
resistor 23: 1800 Ω
breakdown voltage of Zener diode 21: not necessary for 24 V
time constant-timing circuit T1: 6 msec T2: T2=4T1=24 msec T3: T3=0.6T1=3.6msec T4: 100 msec
threshold level of threshold stage 47: 5 V

We claim:
1. In a battery powered supply circuit,
a controlled semiconductor switching element (11) serially connected therein and controlling current flow therethrough;
a control unit (30) furnishing cylical command signals, connected to the switching element and respectively commanding conduction or non-conduction of said controlled switching element, and
a monitoring circuit to supervise commanded non-conduction of the controlled switch comprising,
means (20-28) sensing the voltage across the semiconductor switching element (11) and supplying a sensing signal representative thereof, and hence of the conduction, or non conduction state of said semiconductor switching element;
logic comparison circuit means (T1, 42, 44) connected to the sensing means to receive the sensing signal, and to the control unit (30) to receive said command signal for logically comparing if (a) a non-conduction command signal is present and (b) the sensing signal has a characteristic representative of non-conduction of the semiconductor switching element (11);
and means (47, 303) connected to and controlled by said logic comparison circuit means and connected to control the control unit (30) to prevent application of conduction comman signals therefrom to the controlled semiconductor switching element (11) if said comparison conditions indicate
(a) absence of the non-conduction characteristic of the sensing signal and
(b) presence of a non-conduction command signal.

2. Circuit according to claim 1, wherein the controlled semiconductor switching element (11) is a thyristor;
a turn-OFF thyristor (12) and a turn-OFF capacitor (13) are connected in parallel to the main conduction path of said main thyristor (11);
and a transformer (14) having a primary winding serially connected in said power supply circuit and a secondary winding (141) connected to charge said turn-OFF capacitor through a turn-OFF charge thyristor (15).

3. Circuit according to claim 1, wherein the sensing means includes an opto-coupler (20) and diode means (21, 22) serially connected with the primary of the opto-coupler, the series circuit of the primary of the opto-coupler and the diode means being connected across the main conduction path of said semiconductor switching element.

4. Circuit according to claim 3, wherein said semiconductor switching element comprises a main thyristor (11).

5. Circuit according to claim 4, wherein said diode means includes a Zener diode (21) and a unilaterally conductive diode (22).

6. Circuit according to claim 1, wherein said logic comparison circuit means includes a first timing circuit (T1, 31-35) connected and responsive to the non-conduction command signal and providing an output after a first predetermined timing interval;
a second timing circuit (T2, 37-40, 63, 64) connected to and controlled by the sensing signal and providing an output after a second predetermined time delay if the sensing signal has a characteristic representative of non-conduction of the controlled semiconductor switching element (11);
and a logic connection circuit (41-43) connecting the outputs of said timing circuits and providing an output if, and only if, the first timing interval has elapsed and the first timing circuit provides an output and the second timing circuit has not responded.

7. Circuit according to claim 6, wherein the timing interval of the second timing circuit (T2, 37-40, 63, 64) is longer than the first timing interval of the first timing circuit (T1, 31-35).

8. Circuit according to claim 6, wherein the means connected to the control unit (30) includes a threshold circuit (47) to provide a disable signal to a disable terminal (303) of the control unit, said threshold circuit being connected to and controlled by the output from said logic connection circuit (41-44).

9. Circuit according to claim 8, further including a third timing circuit (T3, 45, 48) connected between the output of the logic connection circuit and the input of the threshold circuit (47) to provide for delayed response of the threshold circuit to the output of the logic connection circuit.

10. Circuit according to claim 8, wherein the voltage sensing means includes an opto-coupler (20) having an input connected across the main conduction path of the controlled semiconductor switching element;

and an opto-coupler monitoring circuit is provided to monitor operation of the opto-coupler and control the control unit to disable application of conduction command signals in case of malfunction of the opto-coupler comprising an RC coupling circuit (60, 62) connecting the output of the opto-coupler (20) to the input of the threshold circuit (47) to control the threshold circuit to provide a disabling signal to the control unit (30) if the signal at the output of the opto-coupler, after having passed through the RC circuit, has a value comparable to a signal representative of conduction of the controlled switching element (11).

11. Circuit according to claim 10, wherein the controlled semiconductor switching element (11) comprises a main switching thyristor (11).

* * * * *